Aug. 1, 1950 E. M. OSTLUND ET AL 2,516,906

RESISTANCE MODULATOR FOR FREQUENCY MODULATION

Filed Oct. 21, 1947

INVENTORS
EVERT M. OSTLUND
MARTIN SILVER
ANTONIO R. VALLARINO
BY Robert Harding Jr.
ATTORNEY Patented Aug. 1, 1950 2,516,906

UNITED STATES PATENT OFFICE 2,516,906

RESISTANCE MODULATOR FOR FREQUENCY MODULATION

Evert M. Ostlund, Montclair, N. J., and Martin Silver, Rego Park, and Antonio R. Vallarino, New York, N. Y., assignors to International Standard Electric Corporation, New York, N. Y., a corporation of Delaware Application October 21, 1947, Serial No. 781,164

16 Claims. (Cl. 332—23)

The present invention relates to frequency modulating circuits and more particularly to a circuit arrangement for modulating the frequency of an oscillator of the resistance-capacity type.

It is known that the operating frequency of an oscillator having a resistive-capacitive or non-resonant feedback path is determinable with great accuracy by the values of the impedances in said path and consequently may be conveniently varied by modifying either the resistances or the capacitances in the feedback circuit. For low frequency modulation, e. g. for the transmission of telegraphy signals, this may be done in simple manner by mechanical means, but conditions are different for audio frequency modulation where rapid impedance variations are required. Although the use of a vacuum tube as a readily controllable resistance element suggests itself, one difficulty arises immediately in that the use of such a tube in the feedback circuit of an oscillator tends to introduce undesired amplitude modulation. This difficulty is usually aggravated by the fact that a relatively large load resistance is required across the tube in order to prevent virtual short-circuiting of the latter through its power supply.

Accordingly, it is an important object of the present invention to provide a novel and efficient circuit arrangement for frequency modulating a carrier wave with audio frequencies, the carrier wave being produced by an oscillator of the resistance-capacity type.

Another object of the invention is to provide an arrangement for modulating the output of a resistance-controlled oscillator by electronic discharge means.

A further object of the invention is to provide, in an oscillator, a variable feedback resistance controlled by a modulating signal in such a manner that the voltage across said resistance remains substantially constant.

According to a feature of the present invention there is provided a modulating circuit for an oscillator of the character described, comprising a pair of tandem-connected vacuum tubes having their input circuits coupled in parallel to a source of audio frequency signals, the arrangement being such that the plate resistances of the two tubes are effectively in parallel for alternating currents. There is thus formed a bridge circuit with the two plate resistances connected in opposite arms, the input circuit of the oscillator being connected across one diagonal so that the simultaneous variations of these resistances will not affect the balance of the bridge and will not apply alternating potentials to the oscillator input. On the other hand the resistance seen by the oscillator will be essentially one-half the plate resistance of either tube (assuming their magnitudes to be substantially equal) and modification of this resistance, across which the feedback voltage is developed, will result in a corresponding change in the oscillator frequency.

These and other features and objects of the invention will become more clearly apparent in the course of the following description, taken in conjunction with the accompanying drawing in which.

Figures 1, 2:
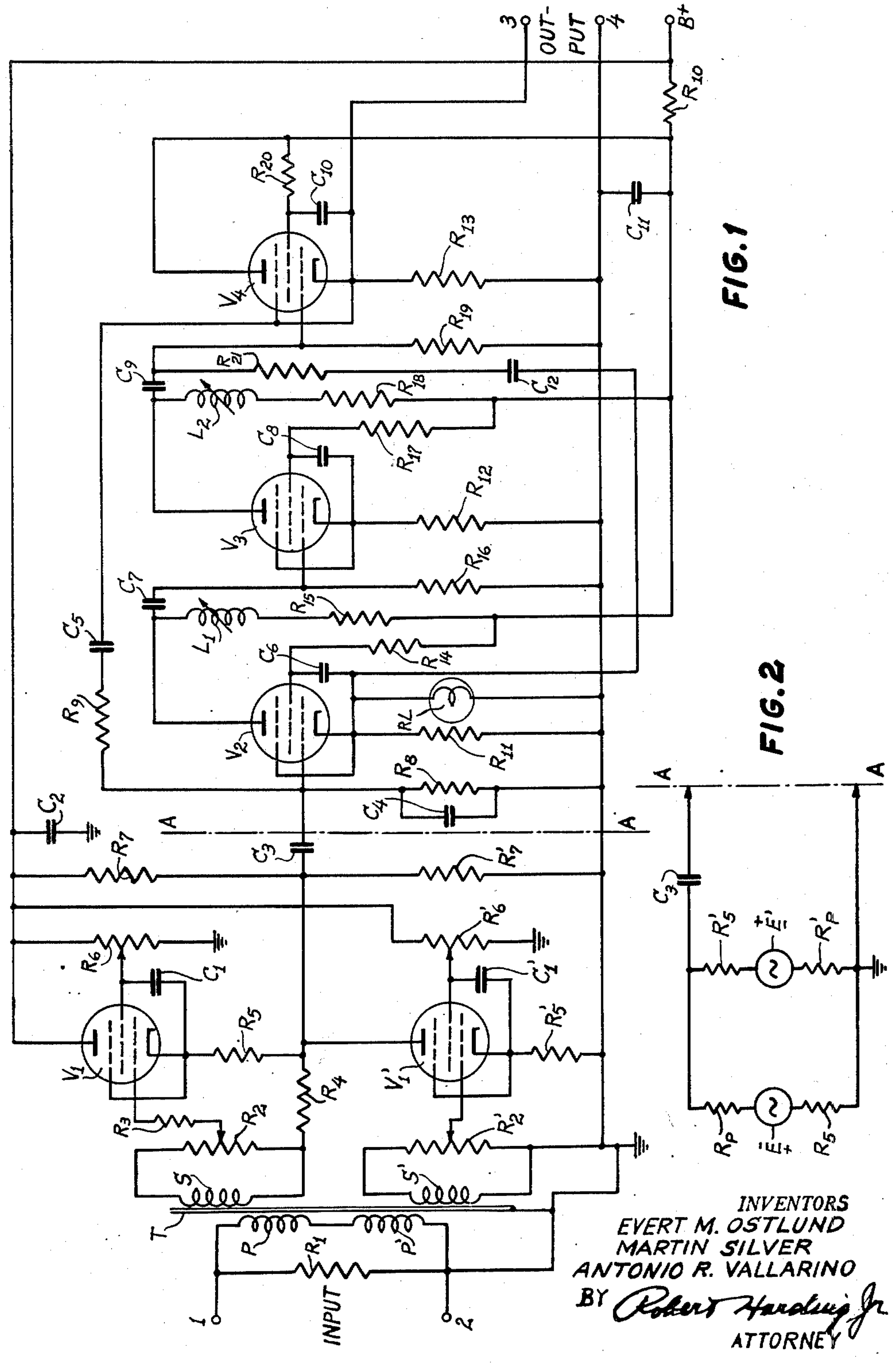
Fig. 1 is a circuit diagram illustrating a preferred embodiment of the invention.
Fig. 2 is an equivalent circuit of the modulator, used to explain the basic principles of the invention.

Fig. 1 shows an arrangement in which a modulator according to the invention, shown at the left of line A—A, is connected to a conventional three-stage oscillator of the resistance-capacity type. The modulator is seen to comprise a pair of vacuum tubes V1, V1', supplied with modulating voltages from input terminals 1, 2 over an audio transformer T, while the output of the oscillator comprising pentodes V2, V3 and V4 is taken off at terminals 3, 4. Disregarding for the moment that part of the circuit which is at the left of the line A—A, it will be noted that the oscillator has a feedback path which extends from the cathode of the last tube V4 to the control grid of its first tube V2 and includes the series combination of a condenser C5 and a resistor R9 in series with the parallel combination of a condenser C4 and a resistor R8 which latter is connected between the grid and the cathode of V2. It will be remembered that the operating frequency $f$ of the oscillator is given by the formula $$f=\frac{1}{2\pi\sqrt{R'C'R''C''}} \qquad (1)$$

wherein R' is the value of the series resistance R9, R'' that of the parallel resistance R8, C' the capacity of series condenser C5 and C'' that of shunt condenser C4, the impedance values being preferably selected so that $$R'C'=R''C'' \qquad (2)$$

Under these conditions the voltage across the shunt circuit R8, C4 at the operating frequency will be in phase with the voltage across the series circuit R9, C5 and, hence, with the overall feedback voltage while the magnitude of the portion fed back will be at a maximum, thus resulting in great frequency stability.

Suppose, now, that a variable resistance Rv is connected across the input terminals of tube V2, shunting the resistance R8 and thereby modifying the value of R'' to the form $$R''=\frac{R8\times Rv}{R8+Rv} \quad (3)$$

or, if R8 is very much larger than Rv, R'' assumes the value of Rv. It is therefore possible by varying Rv to change the operating frequency of the oscillator and from Equation 1 it will be seen that, at least in the region where condition (2) is substantially fulfilled, $f$ varies inversely with the square root of Rv.

Turning now to Fig. 2 which represents the equivalent A.-C. circuit diagram for the modulator shown in Fig. 1, it will be seen that vacuum tube V1 has been replaced by its plate resistance Rp in series with a voltage generator E while tube V1' has been similarly replaced by its plate resistance Rp' in series with a voltage generator E'. The voltages produced at any instant by generators E, E' are of opposite polarity as indicated and are of the same magnitude; R5, R5' are the feedback resistances connected to the cathodes of tubes V1, V1', and C3 is a coupling condenser of low reactance at audio frequencies. Thus, if $Rp=Rp'$ and $R5=R5'$, the voltage drops across both branches of the equivalent circuit will balance and no alternating voltage will be applied to coupling condenser C3 by the modulator. Having established this relationship, we may now eliminate the generators E, E' and regard Rp, Rp' as the variable internal resistances of tubes V1, V1' which are thus connected in a bridge network with cathode resistors R5, R5', a diagonal of the bridge being connected between ground and condenser C3. It will be evident that the simultaneous variation of resistances Rp, Rp' in the same sense will not affect the balance of the circuit.

Turning again to Fig. 1 it will be seen that the other terminal of condenser C3 is connected to the junction point of resistors R8 and R9 which in turn is connected to the grid of pentode V2, hence the modulator is effectively connected in shunt with the parallel combination of condenser C4 and resistor R8 thereby serving as the variable resistance Rv (the impedance of coupling condenser C3 is negligible at the oscillator frequencies). The value of Rv as seen by the oscillator will be $$Rv=\tfrac{1}{2}(Rp+R5) \quad (4)$$

yet because R5 will generally be small compared with Rp we can write $$Rv\approx Rp/2 \quad (5)$$

For zero signal the value of Rp should be selected so that when the above expression for Rv is substituted in Equation 3 the result should satisfy Equation 2.

The modulating signal is developed across input resistance R1 and is fed to the primaries P, P' of transformer T in series, each secondary S, S' being in series with a respective potentiometer R2, R2' the slider of which is connected to the control grid of the associated modulator tube V1, V1'. In the case of tube V1 a resistor R3 is inserted between the potentiometer and the grid while another resistor R4 connects the cathode resistor R5 to the junction of secondary S and potentiometer R2. The corresponding junction of S' and R2' as well as the corresponding terminal of cathode resistor R5' are grounded. Resistors R3 and R4 are designed to isolate the input circuit of tube V1 from the radio frequency oscillations applied by the oscillator to coupling condenser C3 to which the lower terminal of cathode resistor R5 as well as the plate of tube V1' are connected.

The tubes V1, V1' have been shown as pentodes; C1, C1' are the usual screen bypass condensers while R6, R6' represent respective screen biasing resistors connected to the positive terminal B+ of an associated power source (not shown) the negative terminal of which is grounded. The plate of tube V1 is connected directly to B+ while that of tube V1' is connected to an intermediate point of a voltage divider R7, R7' provided between B+ and ground. Resistor R7 determines the anode voltage for tube V1 while resistor R7' determines the anode voltage for tube V1', and from considerations previously discussed it will be clear that the two resistors should be alike. At the same time it will be desirable to make these resistances large enough that their shunting effect on the modulating resistance Rv may be disregarded. C2 is an audio and radio frequency bypass condenser bridged across the power source, thus providing a return path for alternating current between the plate of V1 and the cathode of V1'.

The plate voltage for the oscillator tubes V2, V3 and V4 is obtained from terminal B+ by way of an isolating resistor R10, a bypass condenser C11 similar to C2 shunting the plate terminal of this resistor to ground in order to provide a constant D.-C. operating potential. R11, R12 and R13 are respective cathode resistors providing negative feedback, R14, R17 and R20 are screen dropping resistors and C6, C8 and C10 constitute the associated bypass condensers. The output impedance of tube V2 is represented by a variable inductance L1 in series with a resistor R15; similarly, the output impedance of V3 is a variable inductance L2 in series with a resistor R18. C7, C9 are interstage coupling condensers and R16, R19 are the associated grid leaks. An incandescent lamp RL in parallel with cathode resistor R11 provides amplitude control for the first two stages by being additionally connected, over condenser C12 and resistor R21, to the grid terminal of coupling condenser C9. The output of the final oscillator stage V4 is obtained across the latter's cathode resistor R13.

The initial balance of the modulating circuit will be assured by selecting substantially identical discharge devices for the modulator tubes V1, V1' and by assigning suitable values to the associated resistance elements. Thereafter the potentiometers R2, R2' may be used to equalize the amplitudes of the signals applied to V1 and V1'. Slight divergences in the transconductance characteristics of the modulator tubes may be compensated by modifying the screen grid bias at R6 or R6'.

Although a single preferred embodiment of the invention has been shown, it is to be understood that the same has been described merely by way of illustration and not as a limitation upon the scope of the invention. Thus it will be appreciated that the modulator may be coupled to the oscillator at different points of the feedback path, e. g. across part of the resistance R8 only or across all or part of the resistance R9. Also, while the modulator tubes have been described as pentodes, it will be possible to use tubes having a smaller or a greater number of elements. Various other modifications and adaptations will readily occur to those skilled in the art without constituting a departure from the spirit and scope of the invention as defined in the objects and in the appended claims.

What is claimed is:

1. A frequency modulating arrangement comprising an oscillator having input and output circuits, means for feeding back energy from said output to said input circuit, said means including a non-resonant feedback path composed of resistive and reactive elements, a source of modulating voltage, a pair of electronic discharge devices each having a plate, a control grid and a cathode, means connecting the plate of one to the cathode of the other of said devices, means coupling said source in parallel to the control grids of said devices, a source of plate voltage for said devices, means providing a low impedance path for alternating current between a point of said feedback path on one hand and the plate of said one and the cathode of said other device on the other hand, and means coupling the remaining cathode and plate to another point of the feedback path whereby the two discharge devices are effectively connected in parallel with each other and with a portion of said path.

2. A modulating arrangement according to claim 1, wherein the input circuit of said oscillator comprises an amplifier stage having first and second input electrodes, and wherein the plate of said one and the cathode of said other device are coupled to said first input electrode, the remaining cathode and plate being coupled to the second input electrode.

3. A frequency modulating arrangement comprising a radio frequency oscillator having an input stage and an output stage, said input stage including an amplifier tube having a first and a second input electrode, a regenerative feedback path comprising the series combination of a first condenser and resistor connected between said output stage and said first input electrode, said feedback path further comprising the parallel combination of a second condenser and resistor connected between said first and said second input electrode, a pair of electronic discharge devices each having a plate, a control grid and a cathode, means connecting the plate of one to the cathode of the other of said devices, a source of audio frequency signals, means coupling said source in parallel to the control grids of said devices, a source of plate voltage for said devices, means providing a low impedance path for audio frequency currents between said first input electrode on one hand and the plate of said one and the cathode of said other device on the other hand, and means coupling the remaining cathode and plate to said second input electrode whereby the two discharge devices are effectively connected in parallel with each other and with said second feedback resistor.

4. A modulating arrangement according to claim 3, wherein said means providing a low impedance path is a coupling condenser of negligible reactance at radio frequencies.

5. A modulating arrangement according to claim 3, wherein said source of signals is an audio frequency transformer having two secondary windings each having one terminal connected to the cathode of a respective one of said devices.

6. A modulating arrangement according to claim 5, wherein a potentiometer is connected across each secondary, the slider of the potentiometer being connected to the control grid of the respective discharge device.

7. A modulating arrangement according to claim 6, wherein a radio frequency isolating resistor is inserted between the control grid of said other discharge device and the slider of the associated potentiometer.

8. A modulating arrangement according to claim 7, wherein a further radio frequency isolating resistor is inserted between the cathode of said other discharge device and the secondary associated therewith.

9. A modulating arrangement according to claim 3, wherein a resistor providing negative feedback is connected to the cathode of each of said discharge devices.

10. A modulating arrangement according to claim 9, wherein the value of said negative feedback resistor is small compared with the value of the internal resistance of the associated device.

11. A modulating arrangement according to claim 3, wherein said source of plate voltage is connected between the cathode of said one and the plate of said other discharge device, further comprising a voltage divider connected across said source, and means connecting the plate of said one and the cathode of said other device to an intermediate point on said voltage divider.

12. A modulating arrangement according to claim 11, wherein said intermediate point is the common terminal of a pair of substantially alike resistors.

13. A modulating arrangement according to claim 12, wherein the value of each of said substantially alike resistors is large compared with the internal resistance of said discharge devices.

14. A modulating arrangement according to claim 3, further comprising an audio and radio frequency bypass condenser bridged across said source of plate voltage.

15. A modulating arrangement according to claim 3, wherein each of said electronic discharge devices is a vacuum tube having a screen grid in addition to its control grid.

16. A modulating arrangement according to claim 15, further comprising adjustable means connected to said screen grids for applying a biasing potential thereto.

EVERT M. OSTLUND.
MARTIN SILVER.
ANTONIO R. VALLARINO.

REFERENCES CITED

The following references are of record in the file of this patent:

UNITED STATES PATENTS

| Number | Name | Date |
|---|---|---|
| 2,321,269 | Artzt | June 8, 1943 |
| 2,346,800 | Usselman | Apr. 18, 1944 |
| 2,418,842 | Kinsburg | Apr. 15, 1947 |
| 2,441,567 | Darlington | May 18, 1948 |